Nov. 24, 1959
C. B. FARR
2,914,015
NON-FOULING ANCHOR
Filed Sept. 26, 1957
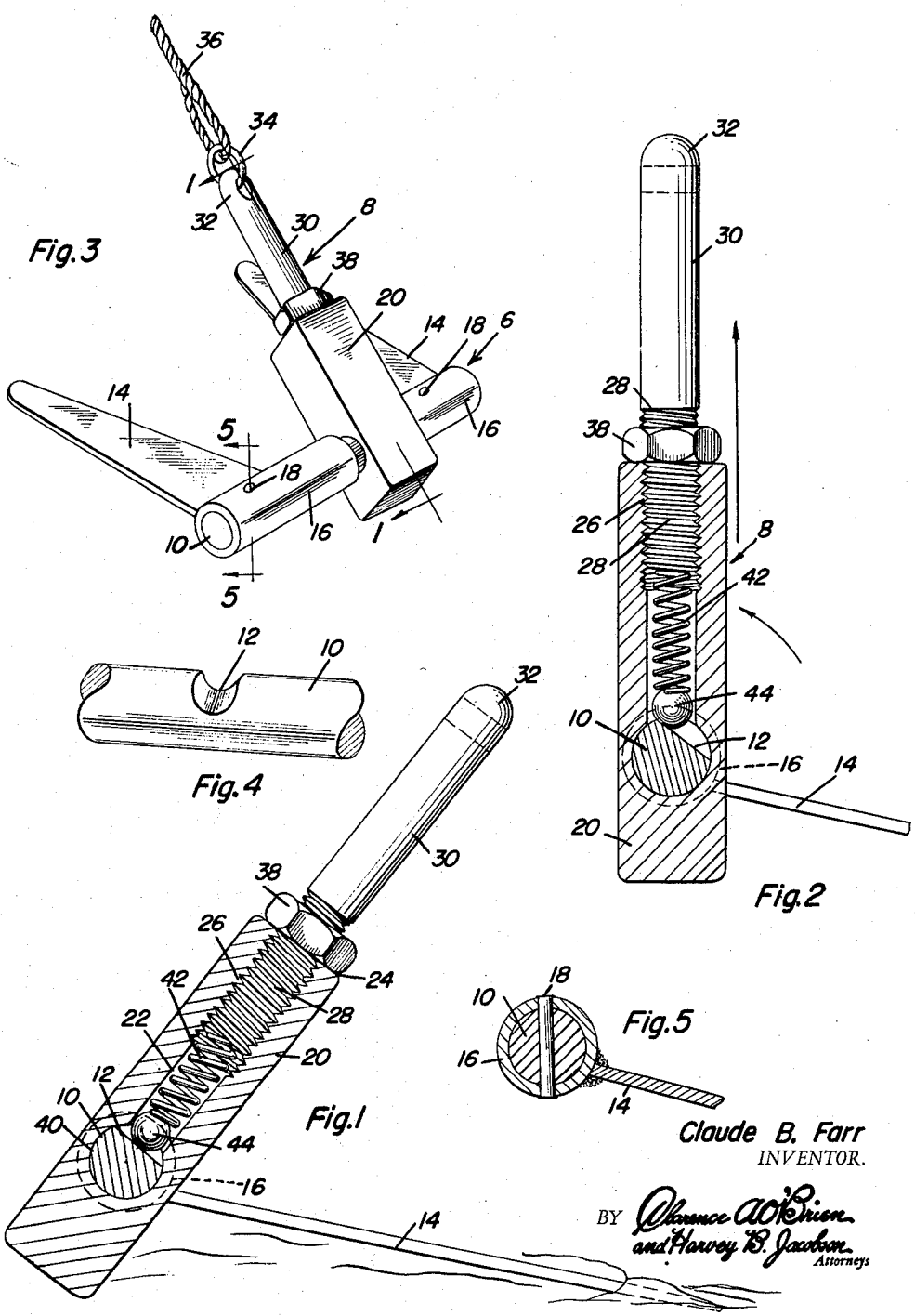
Claude B. Farr
INVENTOR.
BY *Clarence A. O'Brien*
and *Harvey B. Jacobson*
Attorneys

United States Patent Office 2,914,015
Patented Nov. 24, 1959

2,914,015
NON-FOULING ANCHOR

Claude B. Farr, Las Vegas, Nev.

Application September 26, 1957, Serial No. 686,444

2 Claims. (Cl. 114—208)

The present invention relates to certain new and useful improvements in an anchor of a type which is characterized by a shank and a head at the outer end of the shank, the head being characterized by flukes which function to embed themselves in a generally well known manner to provide anchorage for a boat.

More particularly, the invention pertains to an anchor wherein the shank is releasably latched on the fluke-equipped head in such a way that it is possible for the anchor to function as would be the case of a one-piece anchor, while at the same time permitting the angle of the shank to be switched to a position for releasing the anchor in case it gets stuck. As will be evident from the preceding general comments, anti-fouling and non-fouling anchor constructions are not new. For example, the state of development of the art can be partially comprehended after having considered the Burleson Patent No. 2,576,172 and the Newby Patent No. 2,415,605.

It will be evident from the prior patents and also from an almost passing glance at the drawing that it is old in the art to provide a head characterized by a shaft having flukes pinned and fixed to the end portions of the shaft and wherein the shank from the lifting and lowering rope is hingedly attached at one end to the intermediate portion of the shaft, latch means being provided to permit the shank to assume a normal acute angled position and to be switched to a substantially obtuse angle position for withdrawing the flukes from beneath a rock or similar obstruction.

In carrying out the principles of the instant invention, improved shank and latching means is provided. More particularly, the means is characterized by a spring-biased ball serving as a detent and cooperating with a notched portion at the center of the fluke-carrying shaft. The ball detent and notched shaft function at a predetermined pressure, allowing the shank to trip over and to thus free the anchor, that is, if the anchor has become hung.

Other objects, features and advantages will become more readily apparent from the following description and the accompanying drawing.

In the drawing, wherein like numerals are employed to designate like parts throughout the same:

Fig. 1 is a view in section and elevation taken on the plane of the line 1—1 of Fig. 3, looking in the direction of the arrows.

Fig. 2 is a view of a fragmentary nature based on Fig. 1 and showing the shank in the released position.

Fig. 3 is a perspective view showing the over-all improved anchor to best advantage.

Fig. 4 is a fragmentary perspective view.

Fig. 5 is a section on an enlarged scale on the plane 5—5 of Fig. 3.

Referring now to the drawing, the head as an entity is denoted by the numeral 6 and the composite shank as an entity is denoted by the numeral 8. The head comprises a rigid rod forming a shaft 10 and provided at its central portion with a notch 12 opening through diametrically side portions of the shaft. The flukes or blades are the same in construction and are denoted by the numeral 14 and each one is provided with a sleeve 16 which is fitted over the shaft and is secured by a pin 18.

The shank is characterized by a substantially rectangular block-like member 20 which is provided with an axial bore 22 defining a socket. This socket opens through the end portion 24 and adjacent the last-named end portion the socket is screw-threaded, as at 26, to accommodate the screw-threaded stem portion 28 of the screw member 30. The other end of the screw member 30 is provided with a hole and this end portion provides an eye 32 to which a link or ring 34 is connected, the ring serving as a coupling between said member 30 and the lifting rope or line 36. The numeral 38 designates a lock nut. The inner or lower end of the bore is enlarged, as at 40, and defines a bearing for the central portion of the shaft 10, particularly that portion having the notch 12 therein. The socket serves to accommodate a coil spring 42 and a ball detent 44, thus providing a simple latch which may otherwise be described as a spring biased ball detent. The tension of the spring can be regulated by way of the threaded portion 28 screwing into the screw-threaded portion 26.

As has been already pointed out, the provision of latch means between a shank and the shaft part of a fluke-equipped head is not new. Therefore, the novelty is predicated on the two parts 20 and 30 which go to make up a novel shank construction and which makes for practical use of the spring-loaded ball detent and cooperating notch. Consequently, a construction is provided which more satisfactorily serves the purposes for which the invention is intended.

In operation the ball detent 44 is held in the notched part of the shaft 10 by the coil spring 42. The threaded stem portion 28 of the spring tension adjusting screw or member 30 is screwed into the screw-threaded socket 26 to retain and tension the coil spring. The lock nut 38 is used to prevent the threaded stem from turning, thus keeping the coil spring in an adjusted position. Now, in normal or operating position the coil spring 42 holds the ball detent against the bottom of the kerf or notch 12. The spring under pressure prevents the flukes from turning.

If the anchor becomes hung, a quick jerk on the anchor line 36 causes the ball detent to compress the spring and this allows the ball to retreat, as it were, into the drilled hole or socket thus allowing the shank to swing completely around the back side of the shaft. In this position the anchor can be pulled free and raised. To again set the anchor it is only necessary to swing the flukes around until the ball again drops into the kerf or notch in an obvious manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An anchor comprising a shank provided adjacent one end with a bearing extending through the shank at right angles to the lengthwise dimension and opening through diametrically opposite sides of the shank, a shaft having a median portion mounted for angular rotation in said bearing and having end portions extending beyond the opposite sides of the shank and provided with laterally disposed outstanding flukes, a median portion of the shaft being in registration with an axial socket in said shank, said median portion having a notch, a coil spring located in said socket, a ball detent interposed between one end of the spring and the median portion of said shaft and normally seated in said notch, a spring tensioning member having a screw-threaded portion screwed into said socket and engaged with an adjacent end of said coil spring and having a portion extending axially beyond an adjacent end portion of said shank to accommodate an anchor line, and a locking nut on said screw-threaded portion engageable with a cooperating end portion of said shank.

2. An anchor construction comprising, in combination, a shank provided at its lower end with a bearing, a head comprising a shaft having a median portion mounted for rotation in said bearing and its end portions extending radially beyond diametrically opposite sides of the shank and provided at its respective ends with lateral outstanding flukes, that portion of the shaft confined in said bearing being provided with a keeper notch, and a spring-loaded detent means operatively embodied in said shank, said means being releasably cooperable with said notch, said shank comprising a first part having a screw-threaded axial socket, and a second part having a screw-threaded stem screwed into said socket, said detent means comprising a ball operable in said socket, and a coil spring interposed between the ball detent and shaft.

References Cited in the file of this patent

UNITED STATES PATENTS

| | | |
|---|---|---|
| 2,415,605 | Newby | Feb. 11, 1947 |
| 2,511,286 | Millen | June 13, 1950 |
| 2,576,172 | Burleson | Nov. 27, 1951 |
| 2,629,357 | Jones | Feb. 24, 1953 |
| 2,674,970 | Andrews | Apr. 13, 1954 |
| 2,709,980 | Christie | June 7, 1955 |